(No Model.)

J. W. WEBB.
SEED COTTON CLEANER.

No. 291,442. Patented Jan. 1, 1884.

WITNESSES
C. H. Bates
Philip Mauri

INVENTOR
Jno. W. Webb
by Anderson & Smith
his ATTORNEYS

UNITED STATES PATENT OFFICE.

JOHN WESLEY WEBB, OF UNION SPRINGS, ALABAMA.

SEED-COTTON CLEANER.

SPECIFICATION forming part of Letters Patent No. 291,442, dated January 1, 1884.

Application filed February 24, 1883. Renewed October 16, 1883. (No model.)

*To all whom it may concern:*

Be it known that I, JOHN W. WEBB, a citizen of the United States, residing at Union Springs, in the county of Bullock and State of Alabama, have invented certain new and useful Improvements in Seed-Cotton Cleaners; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
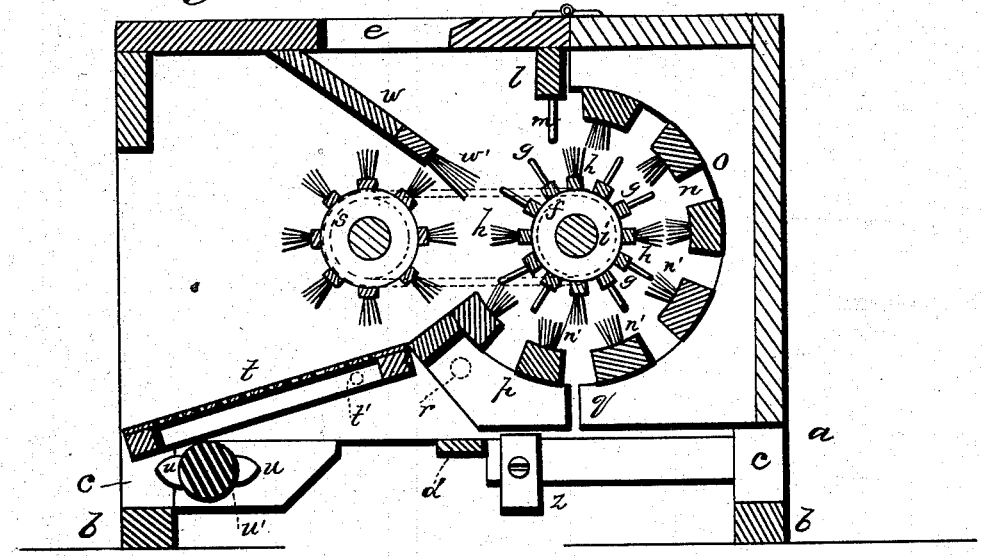
Figure 2:
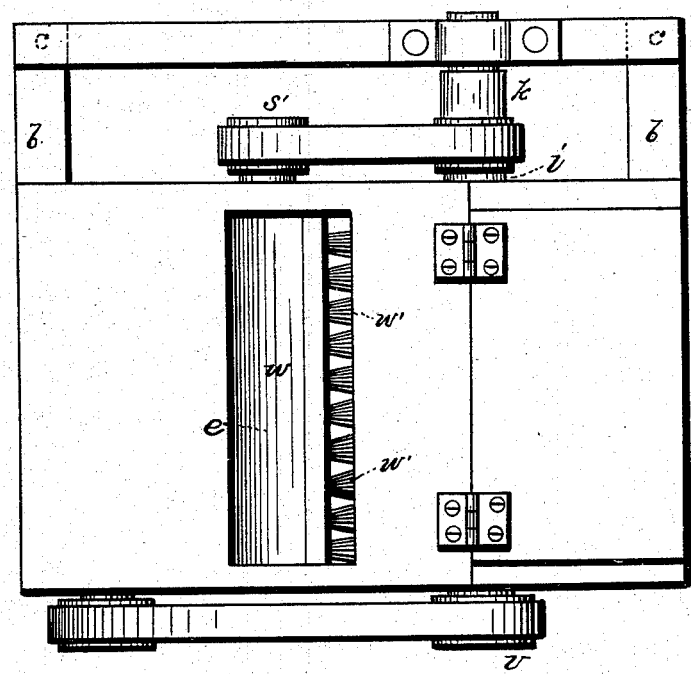

Figure 1 of the drawings is a vertical sectional view of my cleaner, and Fig. 2 is a top view of the same.

The object of this invention is to clean seed-cotton of sand, trash, or any foreign substance prior to ginning the cotton, in order to improve the staple and prolong the usefulness of the gin itself by eliminating all hard substances before ginning the seed-cotton; and to this end the invention consists in the construction and novel arrangement of parts hereinafter fully described, and particularly pointed out in the claims appended.

Referring by letter to the accompanying drawings, $a$ designates the framing, of any desirable construction, preferably composed of the sills $b$, posts $c\ c\ c$, and girts $d\ d$, and a suitable casing.

$e$ designates the hopper or feed-opening, into which the seed-cotton to be cleaned is fed.

$f$ is a drum or cylinder, having teeth $g$ and brushes $h\ h\ h\ h$, which is mounted on a shaft, $i$, and provided with a pulley or band-wheel, $k$, to receive a band by which it is driven.

$l$ designates a spreading-comb or spreader, consisting of a series of toothed slats, $m$, arranged directly over the vertical diameter of the cylinder $f$.

$n$ is a curved brush, having teeth $n'$, constructed in two sections, $o$ and $p$. The section $o$ is hinged to the top of the case immediately in rear of the spreader $l$, and extends around the drum $f$ to the point $q$, directly opposite the spreader $l$, and the section $p$ extends from this point up a short distance in front of the drum $f$, as shown, and is secured in place by a screw or bolt, $r$.

$s$ indicates a brush or fan, and $t$ a pivoted jolting-screen pivoted at $t'$, and operated by a cant-wheel, $u$, on a shaft, $u'$, operated by a belt running from a pulley, $v$.

$w$ is a feed or guide board, having at its lower end a brush-strip, $w'$, provided with brushes for cleaning the teeth of the drum $f$, and preventing the seed-cotton from passing around it the second time. The drum $f$ and the brush or fan wheel $s$ have their bearings in strips at the sides of the casing, and the brush or fan $s$ is provided with a pulley, $s'$, at one end for the belt by which it is run. The section $p$ of the curved brush $n$ extends up to the jolting-screen $t$, and a button, $z$, is employed to hold it in place.

The drum $f$ is preferably constructed of circular heads and a diaphragm on its shaft, connected by slats or strips, in which the brushes and teeth are inserted to leave sufficient space for the sand, trash, &c., to fall to the bottom of the cleaner.

The object of hinging the curved brush and making it in two sections is that it may be swung open and its teeth or brushes cleaned when necessary. The cotton is put into the opening $e$, the drum $f$ takes the cotton and carries it against the spreader $l$, which spreads it or opens it out, and then carries it around the curved brush $n$ and throws it onto the fan-brush $s$, which deposits it upon the jolting-screen, which is sufficiently agitated to shake the remaining sand and trash from the seed-cotton, leaving it ready for the cotton-gin. Interspaces are also left between the ribs of the curved brush to permit sand, &c., to pass through.

Having thus fully described my invention, what I claim, and desire to secure by Letters Patent of the United States, is—

1. In a seed-cotton cleaner, the combination of the drum $f$, having the teeth and brushes $g\ h$, the spreader $l$ above the drum, the curved brush $n$, the fan-brush $s$, guide-board and brushes $w\ w'$, and the jolting-screen $t$, substantially as and for the purposes specified.

2. In a seed-cotton cleaner, the combination, with the sectional curved brush, of the drum $f$, having the brushes and teeth, the spreader $l$, and the brush-fan $s$ and jolting-screen $t$, substantially as specified.

3. In a seed-cotton cleaner, the combination, with the brushes and spreader, as described, of the feed-board having a brush-strip at its lower end, substantially as specified.

In testimony whereof I affix my signature in presence of two witnesses.

JOHN WESLEY WEBB.

Witnesses:
LEWIS SESSIONS,
F. M. BELL.